United States Patent
Lingappa (10) Patent No.: US 10,523,441 B2
(45) Date of Patent: Dec. 31, 2019

(54) AUTHENTICATION OF ACCESS REQUEST OF A DEVICE AND PROTECTING CONFIDENTIAL INFORMATION

(71) Applicant: VISA INTERNATIONAL SERVICE ASSOCIATION, San Francisco, CA (US)

(72) Inventor: Phaneendra Ramaseshu Lingappa, Dublin, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 234 days.

(21) Appl. No.: 15/381,000

(22) Filed: Dec. 15, 2016

(65) Prior Publication Data

US 2017/0171183 A1 Jun. 15, 2017

Related U.S. Application Data

(60) Provisional application No. 62/267,725, filed on Dec. 15, 2015.

(51) Int. Cl.
*H04L 9/32* (2006.01)
*H04L 29/06* (2006.01)
(Continued)

(52) U.S. Cl.
CPC ............ *H04L 9/3247* (2013.01); *G06F 21/31* (2013.01); *H04L 9/3066* (2013.01);
(Continued)

(58) Field of Classification Search
CPC ............. H04L 63/0428; H04L 63/0435; H04L 63/107; G06F 21/31
See application file for complete search history.

(56) References Cited

U.S. PATENT DOCUMENTS 5,781,632 A * 7/1998 Odom .................... G06Q 20/04
705/26.1
5,870,723 A * 2/1999 Pare, Jr. .................. G06F 21/32
705/39
(Continued)

FOREIGN PATENT DOCUMENTS

KR    1020140055429    5/2014
WO    2014/087163 A1   6/2014

OTHER PUBLICATIONS

Supplementary European Search Report for European Patent Application No. 15792244.4-1217 dated Jan. 3, 2018, 8 pages.
(Continued)

*Primary Examiner* — Khang Do
(74) *Attorney, Agent, or Firm* — Kilpatrick Townsend & Stockton LLP (57) ABSTRACT

The systems and methods described herein enable an application on a user device to securely request access to a resource for an order using a selected credential routine. The application can receive order data and a signature based on the order data from an access device. The application can include an interface for selecting a particular credential routine from a plurality of credential routines that can be used to obtain the credential for accessing the resource. Instead of requesting access to the resource via the access device, the application can communicate with an authentication server that can verify the signature based on the order data and obtain authorization of the credential. Thus, the application can select a credential routine and credential for accessing a resource through secure communications with the authentication server.

18 Claims, 7 Drawing Sheets

(51) Int. Cl.
*H04L 9/30* (2006.01)
*G06F 21/31* (2013.01)

(52) U.S. Cl.
CPC ........ *H04L 9/3226* (2013.01); *H04L 63/0435* (2013.01); *H04L 63/061* (2013.01); *H04L 63/0861* (2013.01); *H04L 63/107* (2013.01); *G06F 2221/2111* (2013.01); *H04L 2463/121* (2013.01)

(56) References Cited

U.S. PATENT DOCUMENTS

| | | | |
|---|---|---|---|
| 7,499,889 B2* | 3/2009 | Golan | G06Q 20/04 705/40 |
| 7,565,329 B2* | 7/2009 | Lapsley | G06Q 20/02 382/100 |
| 7,596,530 B1* | 9/2009 | Glasberg | G06Q 20/02 705/30 |
| 8,430,325 B2 | 4/2013 | Jain | |
| 8,925,053 B1* | 12/2014 | Mehta | G06F 21/31 713/155 |
| 9,576,286 B1* | 2/2017 | Artman | G06Q 20/3278 |
| 9,767,457 B1* | 9/2017 | Ford | G06Q 20/12 |
| 9,805,370 B1* | 10/2017 | Quigley | G06Q 20/4014 |
| 2002/0069165 A1* | 6/2002 | O'Neil | G06Q 20/04 705/40 |
| 2007/0162760 A1 | 7/2007 | Samuelsson | |
| 2008/0121687 A1 | 5/2008 | Buhot | |
| 2009/0094123 A1* | 4/2009 | Killian | G06Q 20/0855 705/16 |
| 2009/0215489 A1 | 8/2009 | Kerdraon | |
| 2012/0030044 A1* | 2/2012 | Hurst | G06Q 20/105 705/18 |
| 2012/0166333 A1 | 6/2012 | Von Behren et al. | |
| 2012/0191569 A1 | 7/2012 | Shah | |
| 2012/0310832 A1* | 12/2012 | Hammad | G06Q 10/087 705/44 |
| 2013/0013499 A1 | 1/2013 | Kalgi | |
| 2013/0191227 A1 | 7/2013 | Pasa et al. | |
| 2013/0212660 A1 | 8/2013 | Neafsey et al. | |
| 2013/0232083 A1 | 9/2013 | Smith et al. | |
| 2013/0297509 A1 | 11/2013 | Sebastian et al. | |
| 2014/0058937 A1 | 2/2014 | Watson | |
| 2014/0101042 A1 | 4/2014 | Grissom et al. | |
| 2014/0129438 A1 | 5/2014 | Desai et al. | |
| 2014/0173686 A1* | 6/2014 | Kgil | H04L 63/205 726/1 |
| 2014/0244504 A1* | 8/2014 | Owen | G06Q 20/06 705/44 |
| 2015/0019443 A1 | 1/2015 | Sheets et al. | |
| 2015/0052064 A1 | 2/2015 | Karpenko et al. | |
| 2015/0095238 A1* | 4/2015 | Khan | G06Q 20/325 705/71 |
| 2015/0112860 A1 | 4/2015 | Wang et al. | |
| 2015/0332262 A1 | 11/2015 | Lingappa | |
| 2016/0086155 A1* | 3/2016 | Candelore | G06Q 20/3224 705/21 |
| 2017/0091765 A1* | 3/2017 | Lloyd | G06Q 20/32 |

OTHER PUBLICATIONS

PCT International Search Report in connection with PCT Application No. PCT/US2015/030623 dated Jul. 29, 2015, 15 pages.
Notice of Allowance for U.S. Appl. No. 14/711,615 dated Oct. 11, 2019, 9 pages.

* cited by examiner

AUTHENTICATION OF ACCESS REQUEST OF A DEVICE AND PROTECTING CONFIDENTIAL INFORMATION

CROSS-REFERENCES TO RELATED APPLICATIONS

This is a non-provisional application of, and claims benefit from, U.S. Application No. 62/267,725 filed on Dec. 15, 2015 and entitled "AUTHENTICATION OF ACCESS REQUEST OF A DEVICE AND PROTECTING CONFIDENTIAL INFORMATION."

BACKGROUND

A user device may be used to request access to a resource using a credential. In some situations, the user device may request access to the resource based on order data received from an access device. To access the resource, the user device may send an access request to a resource device. The resource device may authorize the access request based on the credential. In some situations, access requests based on order data are sent to the authorization server via the access device providing the order data. However, certain access devices may not support the credential that the user device uses to access the resource. In other situations, the access request may include confidential information and the user device may not trust the access device or a communication path through the access device. Accordingly, there is a need for improved systems and methods for securing access to resources.

SUMMARY

Embodiments are directed to systems and methods to request access to a resource. In one embodiment, a method for requesting access to a resource includes receiving, by an application executing on a user device, order data and a signature based on the order data. The order data and the signature can be received from an access device. The order data can be for an order made via the access device to a request computer. The signature can be generated by the request computer using the order data and a shared secret key. The shared secret key can be shared between the request computer and an authentication server. The method further includes obtaining, by the application, a selection of a credential routine from a plurality of credential routines installed on the user device, wherein each of the plurality of credential routines have access to a different credential corresponding to a different service for obtaining access to the resource. The method further includes requesting, by the application, a credential from the selected credential routine. The method further includes obtaining, by the application, the credential from the credential routine. The method further includes sending, by the application to the authentication server, an access request including the order data, the signature, and the credential. The access request can be a request for access to the resource. The authentication server can provide a response to the access request based on the order data, the signature, and the credential.

In one embodiment, a method for authenticating an access request includes storing, by an authentication server, a shared secret key that is shared with a request computer. The method further includes receiving, by the authentication server from an application of a user device, an access request including order data, a signature based on the order data, and a credential. The order data can be for an order made via the access device to a request computer. The signature can be generated by the request computer using the order data and shared secret key. The method further includes verifying, by the authentication server, the signature using the order data and the shared secret key that is stored at the authentication server. The method further includes obtaining, by the authentication server, authorization of the access request based on the order data and the credential. The method further includes sending, by the authentication server to the application, a response to the access request based on the verifying of the signature and the obtaining of the authorization.

In one embodiment a user device includes a computer readable storage medium storing a plurality of instructions and one or more processors for executing the instructions stored on the computer readable storage medium. The instructions cause the one or more processors to receive, by an application, order data and a signature based on the order data. The order data and the signature can be received from an access device. The order data can be for an order made via the access device to a request computer. The signature can be generated by the request computer using the order data and a shared secret key that is shared between the request computer and an authentication server. The instructions further cause the one or more processors to obtain, by the application, a selection of a credential routine from a plurality of credential routines installed on the user device. Each of the plurality of credential routines can have access to a different credential corresponding to a different service for obtaining access to the resource. The instructions further cause the one or more processors to request, by the application, a credential from the selected credential routine. The instructions further cause the one or more processors to obtain, by the application, the credential from the credential routine. The instructions further cause the one or more processors to send, by the application to the authentication server, an access request including the order data, the signature, and the credential. The access request can be a request for access to the resource. The authentication server can provide a response to the access request based on the order data, the signature, and the credential.

In one embodiment, an authentication server includes a computer readable storage medium storing a plurality of instructions and one or more processors for executing the instructions stored on the computer readable storage medium. The instructions cause the one or more processors to store a shared secret key that is shared with a request computer. The instructions further cause the one or more processors to receive from an application of a user device, an access request including order data, a signature based on the order data, and a credential. The order data can be for an order made via the access device to a request computer. The signature can be generated by the request computer using the order data and shared secret key. The instructions further cause the one or more processors to verify the signature using the order data and the shared secret key that is stored at the authentication server. The instructions further cause the one or more processors to obtain authorization of the access request based on the order data and the credential. The instructions further cause the one or more processors to send, to the application, a response to the access request based on the verifying of the signature and the obtaining of the authorization.

These and other embodiments of the invention are described in further detail below.

In the drawings, boxes may represent a particular structure, entity, or data element. Dotted or dashed boxes may indicate organization or hierarchy of the boxes contained within. Alternatively, dotted or dashed boxes may indicate optional or alternative structures. Arrows may indicate the flow of data or information. Arrows may also indicate input to a, or output from, a function, process, or step of a method. Dotted or dashed arrows may indicate option or alternative flows of information. Reuse of the same reference number or character may indicate that the same element or structure is used by different structures or elements.

Terms

Certain terms used in the detailed description are described below.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction).

The term "access request" generally refers to a request to access a resource. The access request may be received from a requesting computer, a user device, or an authorization server, for example. The access request may include authorization information, such as a user name, account number, or password. The access request may also include and access request parameters, such as an access request identifier, a resource identifier, a timestamp, a date, a device or computer identifier, a geo-location, or any other suitable information.

The term "user device" generally refers to a computing device that is used by a user (e.g., a person). Typically, a user device will requests access to information, resources, or services. A user device may store and execute software applications for the purpose of requesting and obtaining access to such information, resources, and services. A user device comprise a computer (e.g., desktop computer or laptop computer), a mobile device (e.g., a smart phone, or tablet computer), or a wearable device (e.g., a smart watch or activity tracker). A user device may include wireless communication capabilities (e.g., Wi-Fi, bluetooth, or near-field communications). Generally, a user device can communicate with a server computer.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers coupled to one or more databases.

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC). A symmetric key may also be used in some embodiments.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. In some cases, a shared secret can be used to generate one or more keys. For example, a shared secret can be used to generate one or more "shared secret keys" or "session keys" protecting data or communications.

A "digital signature" generally refers to the result of applying an algorithm based on an encryption key pair, which allows a signing party to manifest, and a verifying party to verify, the authenticity and integrity of data or a document. The signing party can act by means of the private key and the verifying party can act by means of the public key. The signing party and the verifying party may acts by means of a shared secret key. A certificate or other data that includes a digital signature by a signing party is said to be "signed" by the signing party.

As used herein, the term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

DETAILED DESCRIPTION

The systems and methods described herein enable an application that is executed by a user device to securely request access to a resource for an order using a selected credential routine. The order can be made to a request computer via the access device. For example, a user may place an order with a request computer through a user interface of the access device. In some resource access systems, the request computer can receive a resource access request including a credential for a particular resource from the user device and the request computer can send the access request to an authorization server to authorize access. However, such systems require the user device to provide sensitive information (e.g., the credential and any other authorization information) to the access device and the request computer, raising security concerns for the user. In addition, the user may not be able to verify order data for the order.

Instead of sending the access request via the access device, the user device can communicate with a trusted authentication server to request access to the resource. Thus, the user device maintain control of the access request process. In order to request access, the user device can receive the order data and a signature that is based on the order data from the access device. The authentication server van validate the signature using the order data and a shared secret that is shared with the resource computer. Thus, the order data is verified.

The application executing in the user device can also include an interface for selecting a particular credential routine that is used for requesting access to the resource. The different credential routines may have credentials for different resources and so the user may select a certain credential routine in order to access a specific resource using the corresponding credential. As such, the application is advantageous because it allows the user device to maintain control of the resource request process, ensure the validity of the order data from the request computer, and improve security by requesting access through the trusted authentication server.

I. Resource Security System

A resource security system can restrict resource access to authorized users. A user device can request access to a particular resource using a credential. The credential can be provided to an authorization server that can authorize access to the resource based on the credential. If the request is authorized, a resource computer can grant access to the resource. The resource security system is described in further detail below.

Figure 1:
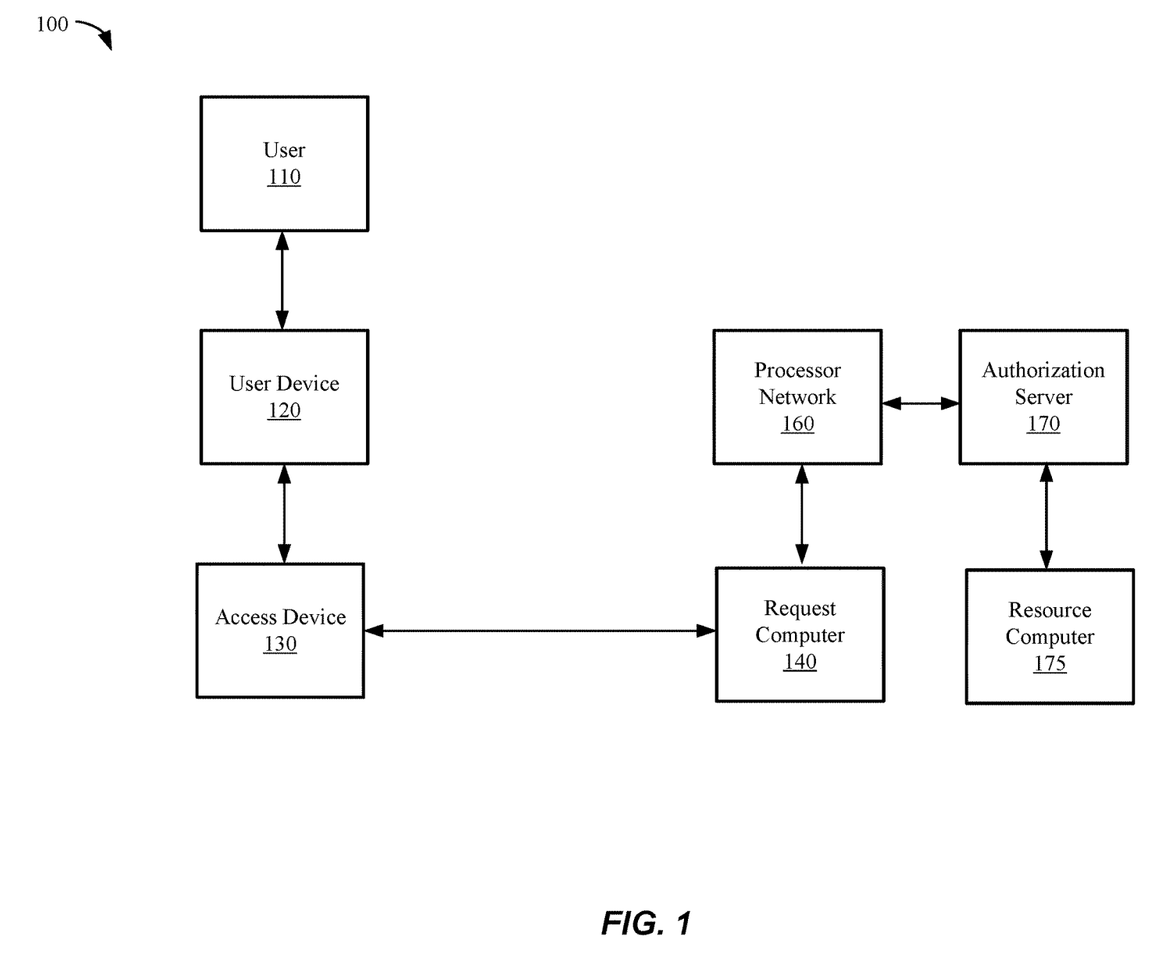
FIG. 1 is a block diagram of a resource security system, in accordance with some embodiments.

FIG. 1 is a block diagram of a resource security system 100, in accordance with some embodiments. The resource security system 100 may be used to provide authorized users access to a resource while denying access to unauthorized users. The resource security system 100 includes an authorization server 170. The authorization server 170 may authorize access to a resource, such as a physical resource (e.g., a building or a lockbox) or an electronic resource (e.g., a local computer account, a digital file or document, a network database, an email inbox, a payment account, or a website login). The authorization server 170 may be a webserver, an email server, or a server of an account issuer.

The authorization server 170 can receive an access request from a user device 120 of a user 110. The access request can request access to a particular resource. The access request may be used to request access to a resource based on an order made to a request computer 140 via an access device 130. The resource may be managed by a resource computer 175 that is in communication with the authorization server 170. The user device 120 can provide the access request via an access device 130 that is in communication with a request computer 140. The request computer 140 may provide the access request from the user device 120 to a processor network 160 that can route the access request to the authorization server 170. The request computer 140 may be a goods or service provider that is different from a resource provider that owns or operates the authorization server 170 and or the resource computer 175.

The access device 130 and the user device 120 may include a user input interface such as a keypad, a keyboard, a finger print reader, a retina scanner, a biometric reader, a magnetic stripe reader, a chip card reader, a radio frequency identification interface, or a wireless or contactless communication interface, for example. The user 110 may input authorization information into the access device 130 or the user device 120 to access the resource. The authorization information may include one or more of a user name, an account number, a password, a personal identification number, and a signature, for example. The user device 120 may store authorization information, such as a credential or token. The user device 120 or the access device 130 may send an access request including the authorization information to the authorization server 170.

The authorization server 170 can authorize the access request based on the authorization information included in the access request and corresponding authorization information stored at the authorization server 170. In response to authorizing access, the authorization server 170 communicate with a resource computer 175 which can grant access to the resource if the access request is authorized. The authorization server 170 may perform the functions of the resource computer 175 itself.

The authorization server 170 can generate an access response that is responsive to the access request. The access response may indicate whether the access request was authorized. The access response may also indicate whether access to the resource was granted. The authorization server 170 can send the access response to the request computer 140 via the processor network 160. The processor network 160 can route the access response to the request computer 140. The authorization server 170 may also send the access response to the user device 120. If the access request is authorized, the authorization server 170 may provide access to the resource according to the access request.

As such, a user device 120 can request access to a resource controlled by the resource computer 175 using an access request sent via the access device 130, the request computer 140, the processor network 160, and the authorization server 170.

II. Resource Access with Authentication

An authentication server can be included in a resource security system to authenticate order data and obtain authorization of access requests. Instead of requesting access to a resource via the access device, the user device can request access via the authentication server.

A. Resource Security System Including an Authentication Server

Figure 2:
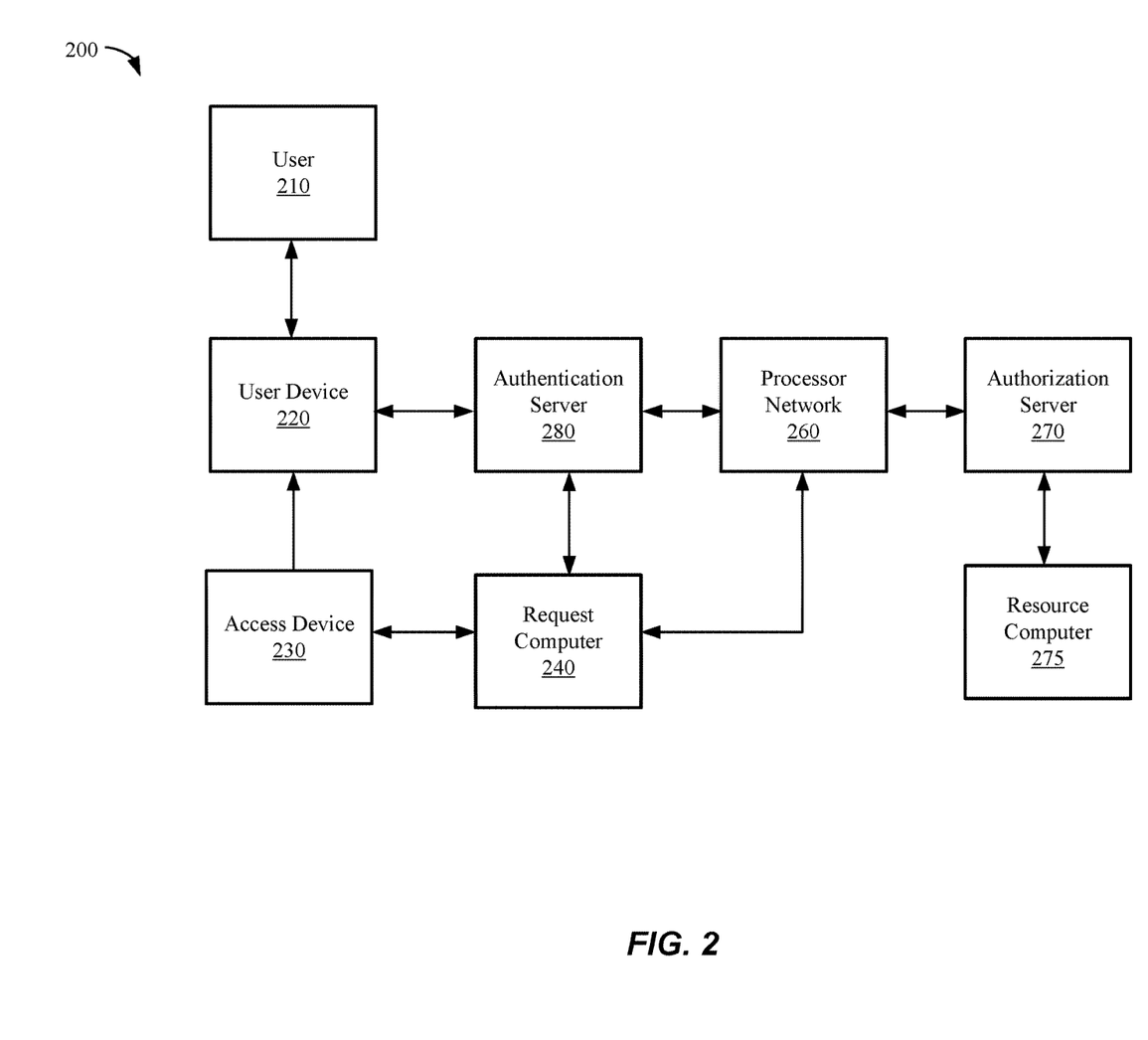
FIG. 2 is a block diagram of a resource security system including an authentication server, in accordance with some embodiments.

FIG. 2 is a block diagram of a resource security system 200 including an authentication server 280, in accordance with some embodiments. The resource security system 200 of FIG. 2 may operate similar to the resource security system 100 of FIG. 1, except as described below.

The resource security system 200 includes an access device 230 that can generate order data for an order with a request computer 240. The access device 230 can send the order data to the request computer 240, which can generate a signature based on the order data using a shared secret. The request computer can send the signature to the access device 230. The access device 230 can send the order data and the signature to the user device 220.

The user device 220 can obtain the order data and the signature provided by the access device 230. The user device 220 can request access to a resource for the order by sending an access request including a credential to an authorization server 270. The order made can be made to the request computer 240 via the access device 230. The authorization server 270 can grant access to the resource based on the credential. The credential can be obtained using a credential routine operating on the user device 220. The user device 220 may include a plurality of different credential routines. The user 210 of the user device 220 can select a credential routine for the access request from among the plurality of credential routines.

The access device 230 may not support the credential routine selected by the user 210 or the user device 220 may not trust a communication path through the access device 230. Accordingly, instead of sending an access request to the access device 230 for routing to the authorization server 270, the user device 220 can send the access request including the credential to the authentication server 280, which is trusted by the user device 220 and can support processing of the credential.

The authentication server 280 can verify the signature based on the order data and obtain authorization of the access request. The authentication server 280 can provide the access request to a processor network 260 for routing to the authorization server 270. The authentication server 280 can authorize the access request using the credential itself.

B. Authentication and Authorization Process

Figure 3:
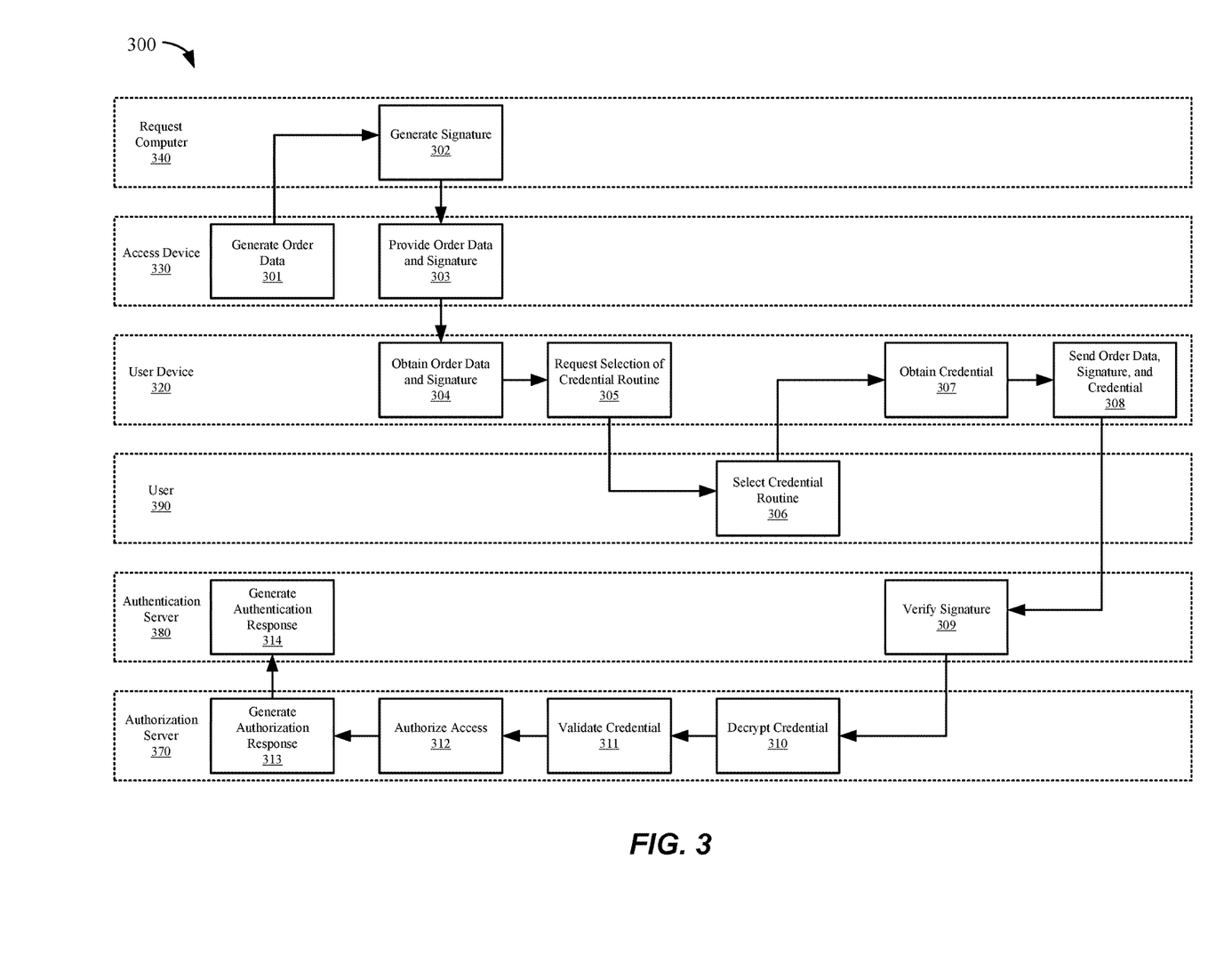
FIG. 3 is a block diagram of steps for authentication of order data and authorization of an access request, in accordance with some embodiments.

As discussed above with reference to FIG. 2, an authentication server can validate order data from a request computer using a signature and an authorization server can authorize a request to access resources for the order. FIG. 3 is a block diagram 300 of steps for authentication of order data and authorization of an access request, in accordance with some embodiments. The process of FIG. 3 may be implemented in the resource security system of FIG. 2.

At 301, an access device 330 can generate order data for an order with a request computer 340. The order data can include at least one of an access device identifier of the access device 330, a request computer identifier that identifies an request computer 340, an order identifier that identifies an order, an order amount value, an geolocation of the access device, and a timestamp. The access device 330 can send the order data to the request computer 340.

The access device 330 can also send an access device fingerprint of the access device to the request computer 340. The request computer 340 can obtain the access device fingerprint from a third party computer. Generally, a device fingerprint can reflect certain hardware and software installed device. As such, the finger print can be used to determine if hardware or software has been added, removed, or modified. If the fingerprint of a device changes over time, then the hardware or software has changed, potentially indicating that the device has been tampered with. The access device 330 can send a geolocation of the access device 330 to the request computer 340.

The request computer 340 can receive the order data from the access device 330. At 302, request computer 340 can create a signature using the order data and a shared secret. The shared secret may be a shared secret key that is shared with an authentication server 380. The signature can include a hash based on at least one of the access device identifier, the request computer identifier, the order identifier, the order amount, and the timestamp of the order data. The hash can also be based on the geolocation of the access device 330. The request computer 340 can encrypt the hash using the shared secret to obtain the signature. The request computer 340 can send the signature to the access device 330. The access device 330 can receive the signature from the request computer 340.

At 303, the access device 330 can provide the order data and the signature to the user device 320. The order data and the signature may be provided to an application that is executing on the user device. The order data and the signature may be in clear text. For example, the access device 330 can display a quick response (QR) code including the order data and the signature, which can be read by the user device 320. The access device can also send the order data and the signature to the user device 320 in a short message service (SMS) message via a mobile gateway.

At 304, the user device 320 can obtain the order data and the signature from the access device 330. The user device 320 can obtain the order data and signature by reading the QR code displayed by the access device 330. In other embodiments, the user device 320 can obtain the order data and signature by receiving the SMS cleartext message from the access device 330 via the mobile gateway.

The user device 320 may also obtain a geolocation of the access device 330 from the access device 330. The geolocation of the access device 330 may be included in the order data. The user device 320 can obtain a user device geolocation of the user device 320 and compare it to the access device geolocation. The user device 320 can then determine whether the access device geolocation and the user device geolocation are within a predetermined range. If the access device geolocation and the user device geolocation are not within the predetermined range, the user device 320 may not request access to the resource. The user device 320 may not request access in such situations because the order data from the access device 330 may be fraudulent if the access device 330 is not within the same geolocation as the user device 320.

The user device 320 can generate an access request message in order to request access to a resource for the order with the request computer 340. To access the resource, the user device 320 may need to provide a credential to an authorization server 370. The user device 320 may include a plurality of different credential routines that can each provide different credentials.

At 305, the user device 320 can request selection of a credential routine for providing a credential for the access request. An application running on the user device 320 can display a user interface presenting the plurality of credential routines to a user 390. The user interface can include a plurality of buttons for the different credential routines. Furthermore, each of the credential routines may have options to use different credentials. A display of the user device can display the user interface generated by the application.

At 306, the user 390 can select one of the credential routines from the plurality of credential routines. For example, the user 390 may provide input to the user interface to select the credential routine through touch. The user may also select a particular credential from among a plurality of credentials that are maintained by the selected credential routine. The user may also need to provide authentication information in order to access the credential routine. For example, the user may enter a password, pin, or fingerprint to access the credential routine.

At 307, the application running on the user device 320 can request and obtain the credential from the selected credential routine. The credential provided by the credential routine is encrypted for the authorization server 370. That is, only the authorization server 370 may be able to decrypt the credential.

At 308, the application can send an access request to the authentication server 380. The access request can include the order data, the signature, and the credential. The application can also send the user device geolocation to the authentication server 380. The authentication server 380 can receive the access request including the order data, the signature, and the credential, from the user device 320. The authentication server 380 can store the same shared secret that was used by the request computer 340 in generating the signature. As such, the authentication server 380 can verify the signature using the shared secret.

The authentication server 380 can also verify that the geolocation of the access device 330 and the geolocation of the user device 320 are within a predetermined range. The authentication server 380 may also determine that an access device fingerprint has not changed compared to a stored access device fingerprint. For example, the authentication server 380 may have stored the access device fingerprint during a registration process for the access device 330. The access device fingerprint may be verified by the authentication server 380 in order to determine that the access device 330 has not been tampered with. The access device fingerprint may be provided by a third party computer.

The authentication server 380 can send the access request including the credential and the order data to the authorization server 370. At 310, the authorization server 370 can decrypt the credential if it has been encrypted. At 311, the authorization server 370 can validate the credential. The authorization server 370 may have previously generated the credential and provided it to the credential routine of the user device 320. As such, the authorization server 370 can validate the credential that it generated.

At 312, the authorization server 370 can authorize the access request based on the order data and whether the credential is valid. At 313, the authorization server 370 can generate an authorization response based on whether the access request was authorized and based on whether the credential was validated. The authorization response can indicate whether the access to the resource was granted or denied. The authorization server 370 can send the authorization response to the authentication server 380. The authentication server 380 can perform the operations that are performed by the authorization server 370.

At 314, the authentication server 380 can generate an authentication response. The authentication response can indicate whether the signature was valid and whether the access request was granted. The authentication server 380 can send the authentication response to one or more of the user device 320, the request computer 340, and the access device 330.

As such, the authentication server 380 can ensure that the order data provided to the user device 320 is authentic by validating the signature using the shared secret that is shared with the request computer 340. In addition, the user device 320 can send sensitive information, such as the access request and the credential, to the authentication server 380 instead of sending it to the access device 330. It is also advantageous to send the access request to the authentication server 380 instead of sending it to the access device 330 because the authentication server 380 may be able to process credentials from a variety of different credential routines that the access device 330 may not be able to process.

III. Signature for Authentication of Order Data

As discussed above with reference to FIG. 3, an authentication server can authenticate order data based on a signature sent with the order data. The signature can be validated using a shared secret key that is shared with a request computer that generated the signature. Authentication of the order data through validation of the signature is described in further detail below.

Figure 4:
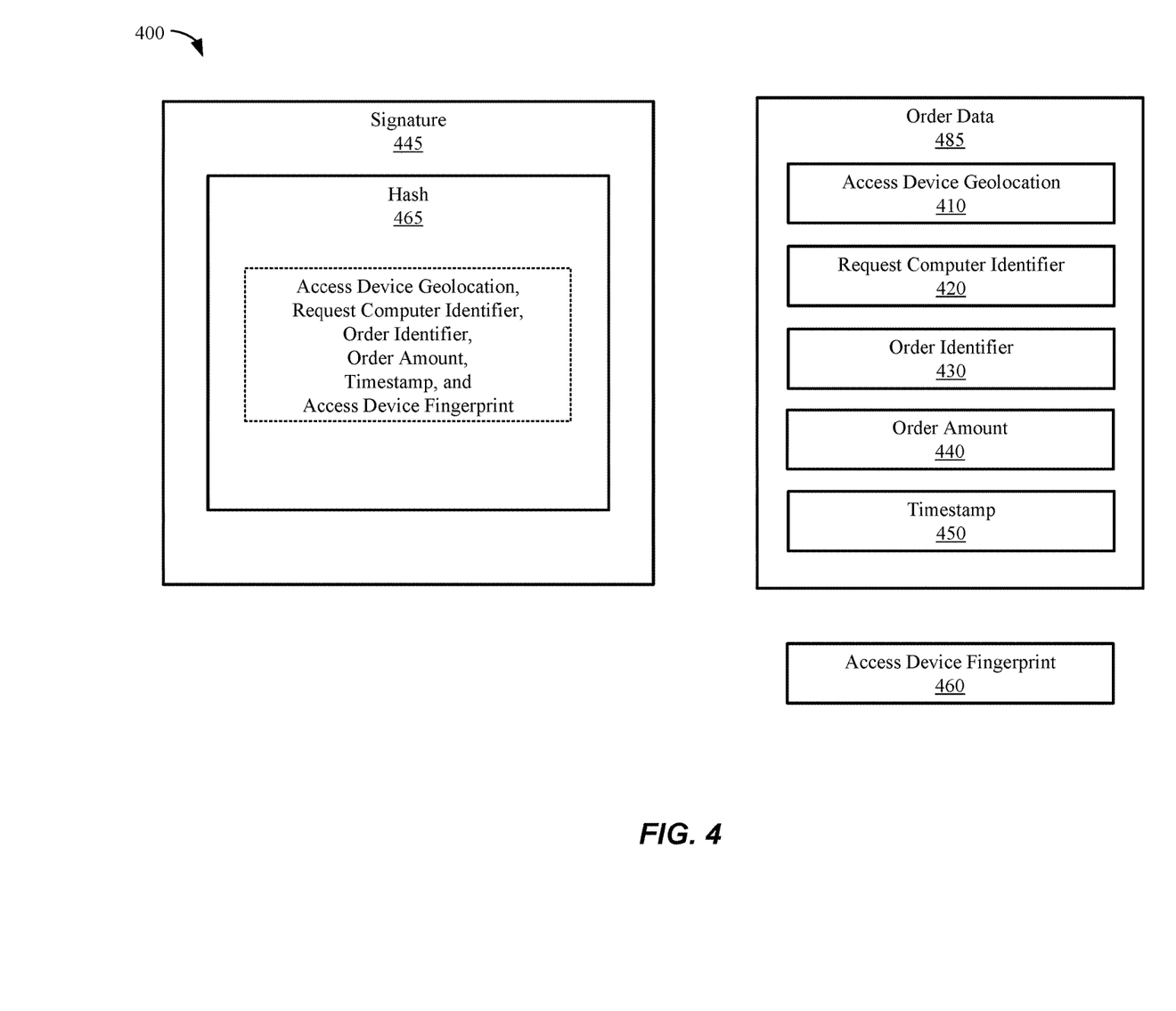
FIG. 4 is a block diagram of a signature, in accordance with some embodiments.

FIG. 4 is a block diagram 400 of a signature 445, in accordance with some embodiments. The signature 445 of FIG. 4 may be used in the authentication process describes above with respect to FIG. 3. As discussed above, a request computer can create the signature 445 for certain order data 485 using a shared secret. The request computer can generate the signature 445 by inputting the order data 485 into a hash function and then encrypting the hash 465 using the shared secret. An access device fingerprint 460 of the access device may also be input to the hash function, along with the order data 485. As such, the hash 465 of the signature 445 can be based on both the order data 485 and the access device fingerprint 460. This fingerprint of the access device can be validated based on the signature to ensure that the access device has not been tampered with. As discussed above, the shared secret may be a shared secret key that is shared with an authentication server.

To validate a signature received from a user device, an authentication server can generate a second signature and compare it to the first signature received from the user device. The authentication server can input the order data received from the user device and a stored access device fingerprint into a hash function to generate a second hash value. The stored access device fingerprint can be stored during a registration process with the access device. The authentication server can use the request computer identifier in the order data to identify a shared secret that is shared with that request computer. The authentication server can use the shared secret to encrypt the second hash value in order to obtain a second signature. The authentication server validates the signature if the signature received from the user device matches the second signature that it generated. During the validation process, the authentication server can also decrypt the signature received from the user device using the shared secure to obtain a first hash value and then compare it to the second hash value that it generated using the order data.

IV. Application Interfacing with a Plurality of Credential Routines

Figure 5:
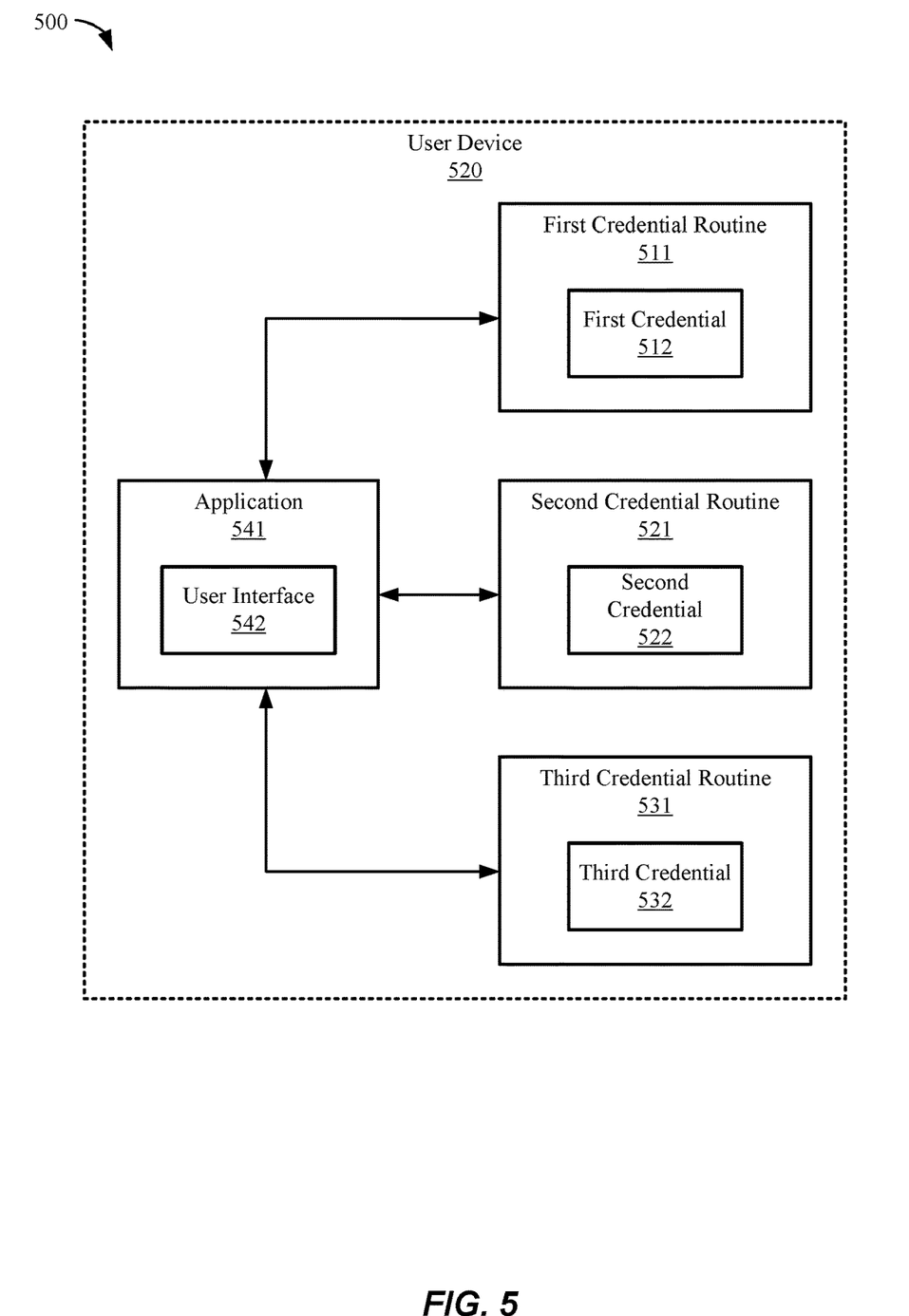
FIG. 5 is a block diagram of a user device including an application and a plurality of credential routines, in accordance with some embodiments.

As discussed above, a user may select a credential routine, from a plurality of credential routines, which can be used for requesting access to a resource. FIG. 5 is a block diagram 500 of a user device 520 including an application 541 and a plurality of credential routines, in accordance with some embodiments. The plurality of credential routines stored on the user device 520 can include a first credential routine 551, which can provide a first credential 512, a second credential routine 521, which can provide a second credential 522, and a third credential routine 531, which can provide a third credential 532. The application 541 executing on the user device 520 can generate a user interface 542 to enable the user to select from among the first credential routine 511, the second credential routine 521, and the third credential routine 531.

Each of the plurality of credential routines can have access to a different credential corresponding to a different service for obtaining access to the resource. The different services may be managed by different authorization servers and/or resource computers. Thus, it is advantageous for the user to have a single interface for selecting from among the plurality of credential routines because the user may need to use different credentials in order to access different resources.

The application 541 can generate the user interface 542 depending on which credential routines are installed on the user device. The application 541 may also generate the user interface 542 based on the types of credential routines that are supported by the particular access device or request computer for this order. The application may receive this information from the access device along with the order data. The user interface 541 may also show the credential routines that are available to be used for this order.

The user device 520 can display the user interface 541 on a display of the user device. The user device 520 can display the user interface 542 after the order data has been received. The user interface 542 may also include information based on the order data. For example, the user interface 542 can display an identifier of the request computer, an identifier of the order, an amount of the order, a timestamp for the order. The user interface 542 can also include other information regarding the order with the request computer.

The user can provide an input to the user interface 542 to select the credential routine. For example, the user may touch a user interface button for the credential routine. The user may also use voice commands to select the credential routine. Then, the application 541 can determine which credential routine was selected based on the input. The application 541 can then request a credential from the selected credential routine. This request can be made via an operating system of the user device, which may call the credential routine.

The selected credential routine can then be executed by the user device 520 in response to being selected. In some situations, the credential routine may already be executing on the user device 520. The credential routine may require the user to be authenticated. The credential routine may provide another user interface for the user to input a password or a pin code. The user may also be authenticated with the credential routine using a fingerprint or another suitable authentication method. The credential routine may also enable the user to select a particular credential from a plurality of credentials that are maintained by the credential routine. The selected credential routine can provide the selected credential to the application 541. The credential routine can encrypt the credential such that only the authorization server may be able to decrypt the credential. The authorization server can validate the credential received from the user device.

As such, the application 541 enables the user to select from among a plurality of different credential routines for accessing different resources while also providing authentication of the order data through communication with the authentication server.

V. Methods for Accessing Resources

The methods described below can be used to request access to a resource and to authenticate an access request.

A. Method for Requesting Access to a Resource

Figure 6:
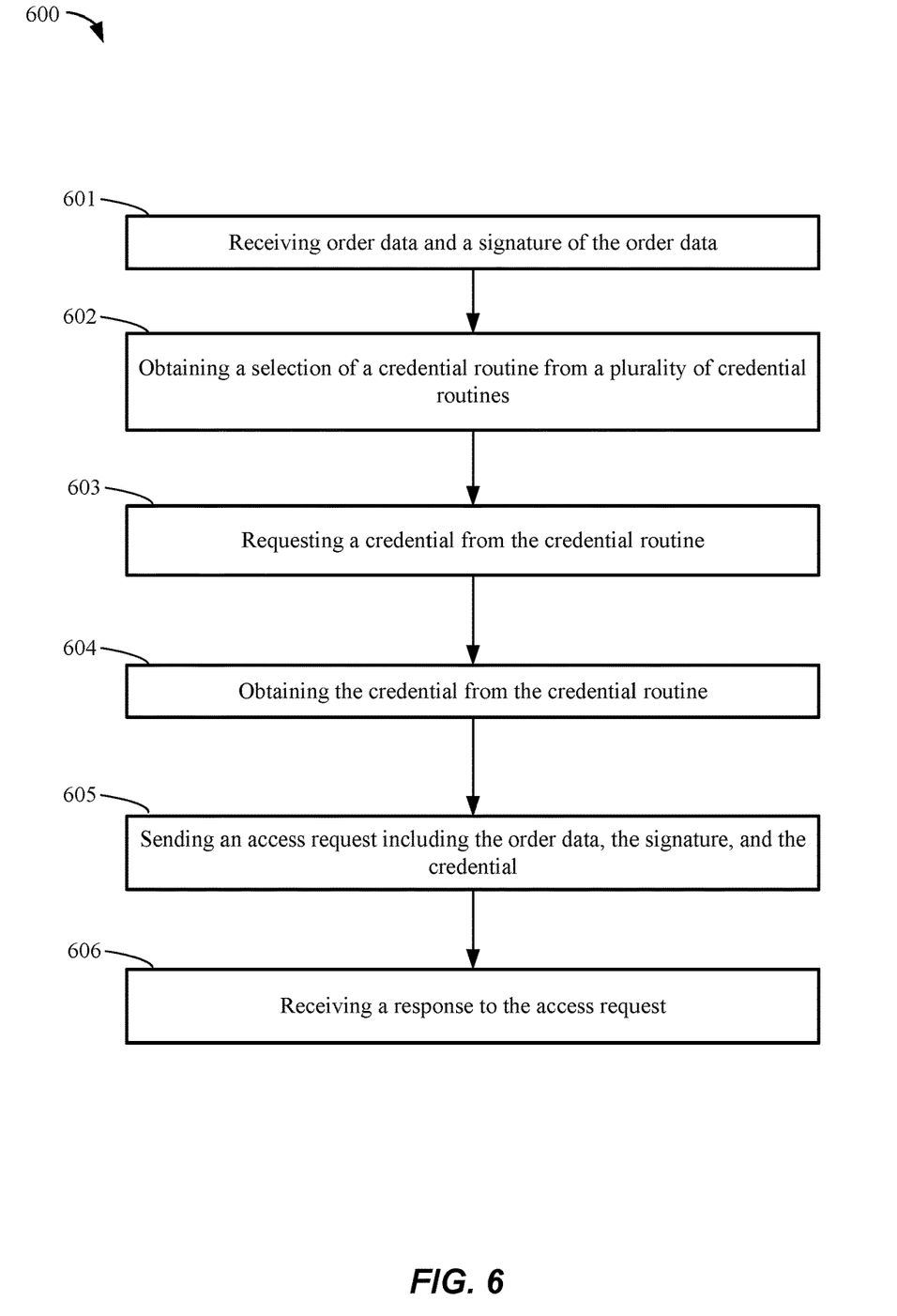
FIG. 6 is a flow chart of a method for requesting access to a resource, in accordance with some embodiments.

As discussed above, an application executed by a user device can request access to a resource for an order using a credential. FIG. 6 is a flow chart 600 of a method for requesting access to a resource, in accordance with some embodiments. For example, the method may be implemented by the user device 220 of FIG. 2, the user device 320 of FIG. 3, or the user device 520 of FIG. 5. Step 601 of the method includes receiving, by an application of a user device, order data and a signature based on the order data, the order data and the signature received from an access device. The order data can be for an order made via the access device to a request computer. The signature can be generated by the request computer using the order data and a shared secret key. The shared secret key can be shared between the request computer and an authentication server. The order data and signature can be received in a cleartext message. For example, the application may read a quick response code or receive a short message service text message that contains the order data and the signature. The order data can include at least one of an access device identifier of the access device, a request computer identifier that identifies the request computer, an order identifier that identifies the order, an order amount value, an access geolocation of the access device, and a timestamp.

The application can also obtain a first geolocation of the user device and a second geolocation of the access device. The application can then determine whether or not the first geolocation and the second geolocation are within a predetermined range. If the access device is not within the predetermined range, that may indicate that the order is fraudulent. As such, the application may not request access to the resource if the access device is outside of the predetermined range.

Step 602 of the method includes obtaining, by the application, a selection of a credential routine, the credential routine being selected from a plurality of credential routines. Each of the plurality of credential routines have access to a different credential corresponding to a different service for obtaining access to the resource. The selection can be obtained via a user interface of the application. For example, a user may provide input to the user interface of the application to select a credential routine for accessing the resource. The application can generate the user interface and the user device can display the user interface on a display of the user device. The user interface can show buttons that enable the user to select one of the plurality of credential routines. The user interface can be touched by the user, or otherwise receive input from the user, to select the credential routine.

Step 603 of the method includes requesting, by the application, a credential from the credential routine. The application may request the credential from the credential routine because the credentials may be securely stored. The request for the credential may include authentication information from the user, such as a password, a pin code, or a fingerprint. The credential routine may only provide credentials to authorized users.

Step 604 of the method includes obtaining, by the application, the credential from the credential routine. The credential provided by the credential routine may be encrypted. As such, the application may not be able to read the credential. The application may enable the user to select a certain credential from a plurality of credentials that are maintained by the credential routine.

Step 605 of the method includes sending, by the application to the authentication server, an access request including the order data, the signature, and the credential, the access request being a request for access to the resource, wherein the authentication server provides a response to the access request based on the order data, the signature, and the credential. The application may also receive a response to the access request from the authentication server indicating whether the access to the resource was granted.

B. Method for Authenticating an Access Request

Figure 7:
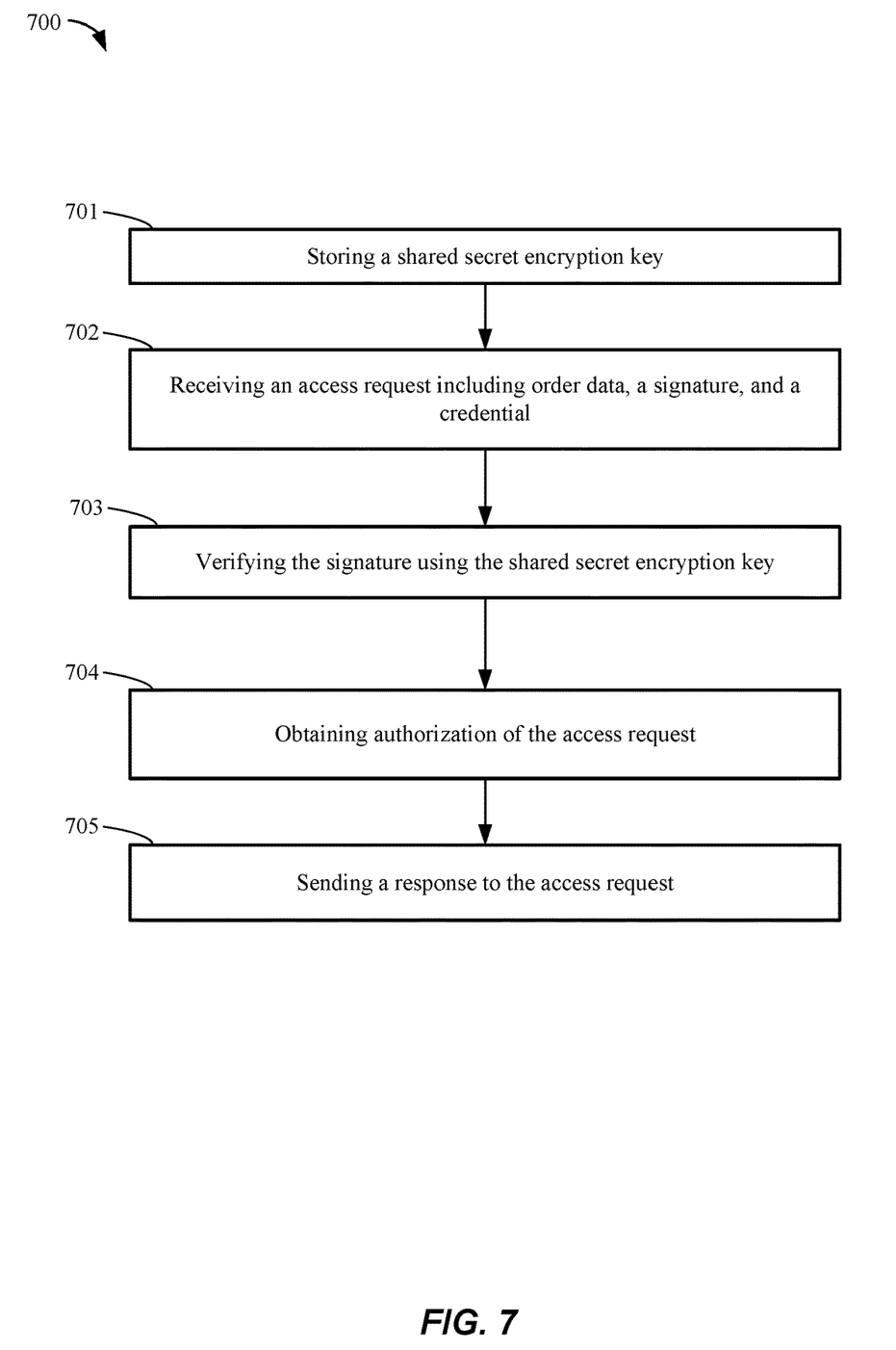
FIG. 7 is a flow chart of a method for authenticating an access request, in accordance with some embodiments.

As discussed above, an authentication server can authenticate order data using a signature generated by a request computer. FIG. 7 is a flow chart 700 of a method for authenticating an access request, in accordance with some embodiments. This method can be implemented by the authorization server 280 of FIG. 2 or the authorization server 380 of FIG. 3. The signature of this method can be implemented similar to the signature described above with reference to FIG. 5.

Step 701 of the method includes storing, by an authentication server, a shared secret key that is shared with a request computer. The authentication server and the request computer may have previously established the shared secret during a registration process. The authentication server may associate the shared secret with an identifier of the request computer. The order data can include a request computer identifier such that the authentication server can identify the appropriate shared secret to use for validating the signature.

Step 702 of the method includes receiving, by the authentication server from an application of a user device, an access request including order data, a signature based on the order data, and a credential. The order data can be for an order made to the request computer via the access device. The signature is generated by the request computer using the order data and shared secret encryption key. The signature may also be generated by the request computer using a fingerprint of the access device.

Step 703 of the method includes verifying, by the authentication server, the signature using the shared secret key. The shared secret key used by the authentication server can be stored at the authentication server. The authentication server can verify the signature my generating a second signature using the order data and its stored shared secret key.

The authentication server may also obtain a first geolocation of an access device with the order data. The authentication server can store a second geolocation of the access device. The second geolocation can be received during a registration process with the particular access device. The authentication server can determine whether the received first geolocation and the stored second geolocation are within a predetermined range. If the access device is not within range of its registered geolocation, then the access device may have been tampered with or the order data may be fraudulent. Thus, the authentication server may not authenticate order data where the first geolocation and the second geolocation are not within the predetermined range.

The hash of the signature may be based on a first fingerprint of the access device. The authentication server can obtain a second fingerprint of the access device that is stored at the authentication server. The authentication server can obtain the second fingerprint of the access device during a registration process with the access device. When the authentication server validates the signature, the stored access device fingerprint can be included in the hash generation function so that the authentication server can determine if the fingerprint of the access device changed. If the access device fingerprint has changed, this may indicate that the access device has been tampered with. Accordingly, the authentication server may not authenticate the signature if the access device fingerprint has changed since registration.

Step 704 of the method includes obtaining, by the authentication server, authorization of the access request based on the order data and the credential. The authentication server may communicate with an authorization server to obtain the authorization. The authentication server can send the credential and the order data to an authorization server. The authorization server can validate the credential. The authorization server may have issued the credential to the credential routine.

Step 705 of the method includes sending, by the authentication server to the application, a response to the access request. The response can be based on the verification of the signature and the authorization of the access request. The response may also indicate whether access was granted by a resource computer.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A method for requesting access to a resource, comprising:
    receiving, by an application executing on a user device, order data and a signature based on the order data, the order data and the signature being received from an access device, the order data being for an order made via the access device to a request computer, wherein the signature is generated by the request computer using the order data, a shared secret key, and a second fingerprint of the access device, wherein the shared secret key is shared between the request computer and an authentication server;
    obtaining, by the application, a selection of a credential routine from a plurality of credential routines installed on the user device, wherein each of the plurality of credential routines have access to a different stored credential corresponding to a different service for obtaining access to the resource;
    requesting, by the application, a stored credential from the selected credential routine;
    obtaining, by the application, the stored credential from the credential routine installed on the user device; and
    sending, by the application to the authentication server, an access request including the order data, the signature, and the stored credential, the access request being a request for access to the resource, wherein the authentication server stores a first fingerprint of the access device received during a registration process with the access device, generates a second signature using the order data, the first fingerprint of the access device, and the shared secret key, compares the second signature to the signature received from the application, verifies the signature based on the comparison to the second signature, and provides a response to the access request based on the verifying of the signature.

2. The method of claim 1, further comprising:
    obtaining, by the application, a first geolocation of the user device;
    obtaining, by the application, a second geolocation of the access device; and
    determining, by the application, that the first geolocation and the second geolocation are within a predetermined range, wherein the sending of the access request is based on the determination that the first geolocation and the second geolocation are within the predetermined range.

3. The method of claim 1, further comprising:
    generating, by the application, a user interface for selecting at least one of the plurality of credential routines;
    displaying, by the user device, the user interface; and
    receiving, by the user device, an input to the user interface, wherein the obtaining of the selection of the credential routine is based on the input.

4. The method of claim 1, further comprising:
    obtaining, by the application, a first fingerprint of the user device; and
    obtaining, by the application, a first geolocation of the user device,
    wherein the access request further includes the first fingerprint and the first geolocation, and
    wherein the response to the access request is further based on the first fingerprint and the first geolocation.

5. The method of claim 1, wherein the order data includes at least one of an access device identifier of the access device, a request computer identifier that identifies the request computer, an order identifier that identifies the order, an order amount value, an access geolocation of the access device, and a timestamp, and wherein the signature includes a hash value that is based on at least one of an access device identifier of the access device, a request computer identifier that identifies the request computer, an order identifier that identifies the order, an order amount value, an access geolocation of the access device, a timestamp, and an access device fingerprint.

6. The method of claim 1, further comprising receiving, by the user device, a cleartext message including the order data and the signature, wherein the user device receives the cleartext message via a bluetooth message, a short message service message, or a quick response code.

7. A method for authenticating an access request, comprising:
    receiving, by an authentication server, a first fingerprint of an access device during a registration process with the access device;
    storing, by the authentication server, the first fingerprint of the access device;
    storing, by the authentication server, a shared secret key that is shared with a request computer;
    receiving, by the authentication server from an application of a user device, an access request including order data, a signature based on the order data, and a credential, wherein the order data is for an order made via the access device to the request computer, wherein the signature is generated by the request computer using the order data, the shared secret key and a second fingerprint of the access device, wherein the credential is stored on the user device, the credential being obtained from a credential routine installed on the user device;
    generating, by the authentication server, a second signature using the order data, the first fingerprint of the access device, and the shared secret key;
    comparing, by the authentication server, the second signature to the signature received from the application;
    verifying, by the authentication server, the signature using the order data and the shared secret key that is stored at the authentication server, the verifying of the signature is based on the comparison of the second signature to the signature received from the application;
    obtaining, by the authentication server, authorization of the access request based on the verifying of the signature; and
    sending, by the authentication server to the application, a response to the access request based on the verifying of the signature and the obtaining of the authorization.

8. The method of claim 7, further comprising sending the shared secret key to the request computer, wherein the shared secret key used for the verifying of the signature is the same as the shared secret key sent to the request computer.

9. The method of claim 7, further comprising:
obtaining, by the authentication server, a first geolocation of an access device from the order data;
obtaining, by the authentication server, a second geolocation of the access device that is stored at the authentication server; and
determining, by the authentication server, that the first geolocation and the second geolocation are within a predetermined range, wherein the response is based on the determination that the first geolocation and the second geolocation are within the predetermined range.

10. The method of claim 7, further comprising sending, by the authentication server, the order data and the credential to an authorization server, wherein the obtaining of the authorization of the access request comprises obtaining the authorization from the authorization server.

11. The method of claim 7, further comprising:
receiving, by the authentication server, a confirmation request from the request computer, the confirmation request requesting an authorization response that indicates whether the access request was authorized; and
sending, by the authentication server, the authorization response to the request computer, the authorization response indicating that the access request is authorized.

12. A user device, comprising:
a computer readable storage medium storing a plurality of instructions; and
one or more processors for executing the instructions stored on the computer readable storage medium to:
receive, by an application, order data and a signature based on the order data, the order data and the signature being received from an access device, the order data being for an order made via the access device to a request computer, wherein the signature is generated by the request computer using the order data, a shared secret key, and a second fingerprint of the access device, wherein the shared secret key is shared between the request computer and an authentication server;
obtain, by the application, a selection of a credential routine from a plurality of credential routines installed on the user device, wherein each of the plurality of credential routines have access to a different stored credential corresponding to a different service for obtaining access to a resource;
request, by the application, a stored credential from the selected credential routine;
obtain, by the application, the stored credential from the credential routine installed on the user device; and
sending, by the application to the authentication server, an access request including the order data, the signature, and the stored credential, the access request being a request for access to the resource, wherein the access request causes the authentication server to store a first fingerprint of the access device received during a registration process with the access device, generate a second signature using the order data, the first fingerprint of the access device, and the shared secret key, compare the second signature to the signature received from the application, verify the signature based on the comparison to the second signature, and provide a response to the access request based on the verifying of the signature.

13. The user device of claim 12, wherein the instructions further cause the one or more processors to:
obtain, by the application, a first geolocation of the user device;
obtain, by the application, a second geolocation of the access device; and
determine, by the application, that the first geolocation and the second geolocation are within a predetermined range, wherein the sending of the access request is based on the determination that the first geolocation and the second geolocation are within the predetermined range.

14. The user device of claim 12, wherein the instructions further cause the one or more processors to:
generating, by the application, a user interface for selecting at least one of the plurality of credential routines;
displaying, by the user device, the user interface; and
receiving, by the user device, an input to the user interface, wherein the obtaining of the selection of the credential routine is based on the input.

15. The user device of claim 12, wherein the instructions further cause the one or more processors to:
obtain, by the application, a first fingerprint of the user device; and
obtain, by the application, a first geolocation of the user device,
wherein the access request further includes the first fingerprint and the first geolocation, and
wherein the response to the access request is further based on the first fingerprint and the first geolocation.

16. The user device of claim 12, wherein the order data includes at least one of an access device identifier of the access device, a request computer identifier that identifies the request computer, an order identifier that identifies the order, an order amount value, an access geolocation of the access device, and a timestamp.

17. The user device of claim 12, wherein the signature includes a hash value that is based on at least one of an access device identifier of the access device, a request computer identifier that identifies the request computer, an order identifier that identifies the order, an order amount value, an access geolocation of the access device, a timestamp, and an access device fingerprint.

18. The user device of claim 12, wherein the instructions further cause the one or more processors to receive, by the user device, a cleartext message including the order data and the signature, wherein the user device receives the cleartext message via a bluetooth message, a short message service message, or a quick response code.

* * * * *

UNITED STATES PATENT AND TRADEMARK OFFICE
CERTIFICATE OF CORRECTION

PATENT NO. : 10,523,441 B2
APPLICATION NO. : 15/381000
DATED : December 31, 2019
INVENTOR(S) : Phaneendra Ramaseshu Lingappa Page 1 of 1

It is certified that error appears in the above-identified patent and that said Letters Patent is hereby corrected as shown below:

In the Claims

Claim 5, Column 16, Line 16, "one of an access" should be --one of the access--.
Claim 5, Column 16, Line 17, "device, a request computer" should be --device, the request computer--.
Claim 5, Column 16, Line 18, "computer, an order" should be --computer, the order--.
Claim 5, Column 16, Line 19, "an order amount" should be --the order amount--.
Claim 5, Column 16, Line 19, "value, an access" should be --value, the access--.
Claim 5, Column 16, Line 20, "device, a timestamp" should be --device, the timestamp--.
Claim 7, Column 16, Line 37, "device, an access" should be --device, the access--.

Signed and Sealed this
Sixteenth Day of June, 2020

Andrei Iancu
*Director of the United States Patent and Trademark Office*